US008253973B2

(12) United States Patent
Huedepohl et al.

(10) Patent No.: US 8,253,973 B2
(45) Date of Patent: Aug. 28, 2012

(54) METHOD FOR ACCURATELY FINDING A PHYSICAL LOCATION ON AN IMAGE BEARING SURFACE FOR TONER IMAGES FOR OPTIMAL STREAK CORRECTION

(75) Inventors: Ralph Huedepohl, Bloomfield, NY (US); Terri A Clingerman, Palmyra, NY (US); Gerald L. Coy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 906 days.

(21) Appl. No.: 12/254,500

(22) Filed: Oct. 20, 2008

(65) Prior Publication Data

US 2010/0097621 A1 Apr. 22, 2010

(51) Int. Cl.
*G06K 15/10* (2006.01)
*G01D 15/06* (2006.01)
*G03G 15/01* (2006.01)

(52) U.S. Cl. ............ 358/1.5; 358/1.1; 358/1.9; 358/1.2; 358/2.1; 358/3.27; 358/1.13; 358/300; 358/488; 347/19; 347/40; 347/116; 347/131; 347/132; 347/232; 347/234; 347/235; 347/250; 347/251; 399/49; 399/51; 399/76; 399/78; 399/132; 399/167; 399/200; 399/343; 399/182; 399/297; 399/160; 399/252; 399/266; 399/301; 399/308; 399/309

(58) Field of Classification Search ........................ None
See application file for complete search history.

(56) References Cited

U.S. PATENT DOCUMENTS

| | | | | |
|---|---|---|---|---|
| 4,365,888 | A * | 12/1982 | Hosaka et al. | 399/36 |
| 5,101,232 | A * | 3/1992 | Evans et al. | 399/160 |
| 5,216,256 | A * | 6/1993 | Kusumoto et al. | 250/548 |
| 5,278,589 | A | 1/1994 | Wong | |
| 5,365,074 | A | 11/1994 | Genovese | |
| 6,525,751 | B2 * | 2/2003 | Hoover | 347/116 |
| 6,904,255 | B2 | 6/2005 | Kera et al. | |
| 7,177,585 | B2 | 2/2007 | Matsuzaka et al. | |
| 7,345,695 | B2 * | 3/2008 | Suzuki | 347/235 |
| 7,386,262 | B2 * | 6/2008 | Okamura et al. | 399/298 |

* cited by examiner

*Primary Examiner* — Steven Kau
(74) *Attorney, Agent, or Firm* — Pillsbury Winthrop Shaw Pittman LLP

(57) ABSTRACT

A method for determining a location on an image bearing surface of an image printing system where a toner image is to be printed is provided. The method comprises generating a first signal from a detector that is configured to detect a reference mark on the image bearing surface, and a second signal from a clock system that counts incremental movements of the image bearing surface, determining a first value that correlates the first signal and the second signal, where the first value corresponds to a value of the second signal at a start of characterization of the image bearing surface, and determining a second value using the first value, where the second value provides the location on the image bearing surface where the toner image is to be printed.

26 Claims, 4 Drawing Sheets

METHOD FOR ACCURATELY FINDING A PHYSICAL LOCATION ON AN IMAGE BEARING SURFACE FOR TONER IMAGES FOR OPTIMAL STREAK CORRECTION

BACKGROUND

1. Field

The present disclosure relates to a method and a system for determining a location on an image bearing surface of an image printing system where a toner image is to be printed.

2. Description of Related Art

For streak correction in an image printing system, it is important to know with as much certainty as possible where toner images are physically placed on an image bearing surface (e.g., a photoreceptor belt or drum) of the image printing system. One of the prior art approaches was to determine how many "machine clock" counts the toner images are offset from the belt hole. The term "machine clock" refers to a counter or other device that monitors the incremental movements of the belt. Each time a machine clock signal is counted, that indicates movement of the image bearing surface by the applicable increment. However, for various reasons, there can be a difference of up to several machine clock counts between what the offset is thought to be, and where the offset actually is. This difference degrades the quality of the streak correction.

In some image printing systems, a belt hole is used as a reference to determine accurate, reliable start locations for calibrations and clean image bearing surface scans. These start locations for calibrations and clean image bearing surface scans were determined by another subsystem, and transmitted to the image printing system, but this method of determining and transmitting the start locations for calibrations and clean image bearing surface scans is often not highly accurate or reliable. Further, the regions on the image bearing surface that are used during calibration cannot be reliably identified by an exact machine clock signal because the machine clock and belt hole clock are asynchronous.

The inventors have recognized that it would be desirable to provide a method to synchronize the image bearing surface and toner image readings in the image printing system so that calibration can be done accurately for streak detection in the image printing system.

SUMMARY

According to one aspect of the present disclosure, a method for determining a location on an image bearing surface of an image printing system where a toner image is to be printed is provided. The method comprises generating a first signal from a detector that is configured to detect a reference mark on the image bearing surface, and a second signal from a clock system that counts incremental movements of the image bearing surface, determining a first value that correlates the first signal and the second signal, where the first value corresponds to a value of the second signal at a start of characterization of the image bearing surface, and determining a second value using the first value, where the second value provides the location on the image bearing surface where the toner image is to be printed.

According to another aspect of the present disclosure, a system for determining a location on an image bearing surface of an image printing system where a toner image is to be printed is provided. The system comprises an image bearing surface, a detector, a clock system, a marking engine, and a processor. The image bearing surface is movable in a process direction and includes a reference mark. The detector is configured to detect the reference mark on the image bearing surface to provide a first signal. The clock system is configured to generate a second signal. The second signal includes pulses of a clock that counts incremental movements of the image bearing surface. The marking engine is configured to print the toner images on the image bearing surface. The processor is configured to determine a first value that correlates the first signal and the second signal, where the first value corresponds to a value of the second signal at a start of characterization of the image bearing surface, and to determine a second value using the first value, where the second value provides a location on the image bearing surface where the toner image is to be printed.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
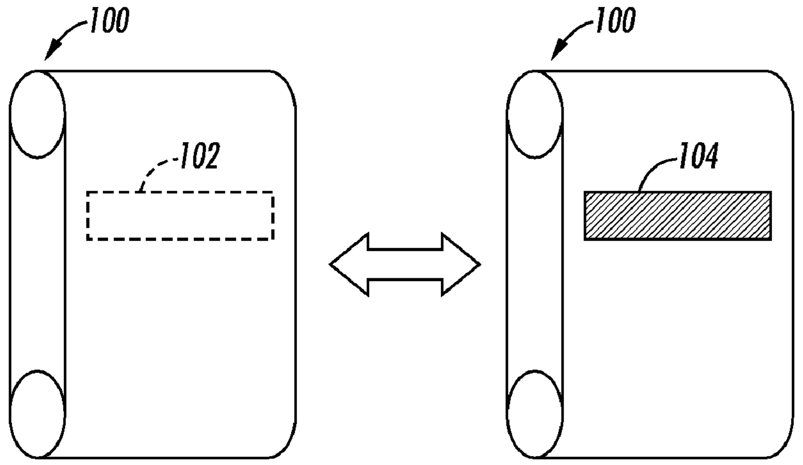
FIG. 1 shows an image bearing surface of an image printing system having a location that corresponds to the location where a toner image is to be printed on the image bearing surface.

A streak correction methodology in an image printing system comprises printing halftone toner images on an image bearing surface, scanning the halftone toner images with a full width array sensor, and then processing the scanned halftone toner images with a processor into a profile which is used to determine the amount of streak correction. The processing step includes normalizing the halftone toner image data between a black value and a white value. The white value generally represents a value of the image bearing surface before placing the halftone images and the black value generally represents a fixed constant. The white value is calculated by scanning the image bearing surface before printing the toner images, converting the scanned image bearing surface (i.e., before placing the toner images on the image bearing surface) into profiles, and storing these profiles in memory. These profiles are later used when the halftone toner images are being processed.

A section or region of the image bearing surface that is used for normalization is important because the image bearing surface is itself non-uniform such that profiles from different locations or sections of the image bearing surface can be significantly different from each other. Further, tiny scratches or other defects may result in even more differences. The image bearing surface profile used to normalize a halftone profile must have been collected over the exact same region or location of the image bearing surface where the halftone toner image is to be printed. The streak correction in the image printing system is improved when the correct location or region of the image bearing surface is used.

The present disclosure proposes a method and a system for determining a location on an image bearing surface of an image printing system where a toner image is to be printed. The method comprises generating a first signal from a detector that is configured to detect a reference mark on the image bearing surface, generating a second signal from a clock system that counts incremental movements of the image bearing surface, determining a first value that correlates the first signal and the second signal, and determining a second value using the first value. The first value corresponds to a value of the second signal at a start of characterization of the image bearing surface and the second value provides the location on the image bearing surface where the toner image is to be printed.

In one embodiment, the present disclosure proposes accurately locating the toner images on the image bearing surface by using timing signals, such as the first signal (e.g., the belt hole signal) and the second signal (e.g., the machine clock signal). In one embodiment, the timing signals (e.g., from the belt hole clock and machine clock) are used to index the image bearing surface profiles and keep track of which image bearing surface profile is needed to normalize each halftone image. The present disclosure uses the first signal (e.g., the belt hole clock signal) to keep track of two values (e.g., a first value and a second value) that allow the correct image bearing surface profile to be used for each halftone. As noted above, the first value is the number of second signals (e.g., the machine clocks) from the reference mark (e.g., the belt hole clock) to the start of the image bearing surface profiling. The first value is used to create the second value, which provides the actual image bearing surface location or section or region that corresponds to the current halftone toner image.

FIG. 1 shows an image bearing surface 100 of an image printing system before a toner image 104 is placed on the image bearing surface 100, and after the toner image 104 is printed on the image bearing surface 100. In one embodiment, the image bearing surface profiles (e.g., before the toner image 104 is printed on the image bearing surface 100) are collected and stored from all around the image bearing surface 100. In one embodiment, the image bearing surface profile (e.g., before the toner image 104 is printed on the image bearing surface 100) that is used to calculate a halftone profile must have been collected over the exact same region or location of the image bearing surface 100 where the halftone toner image 104 is printed. In other words, the image bearing surface profile (e.g., before the toner image 104 is printed on the image bearing surface 100) for the image bearing surface 100 that is used to normalize the toner image 104 is to be collected at the same physical location on the image bearing surface 100. For example, in one embodiment, the image bearing surface profile (e.g., before the toner image 104 is printed on the image bearing surface 100) is collected at a location or region 102 (as shown using phantom lines in FIG. 1) of the image bearing surface 100, where the location or region 102 on the image bearing surface 100 corresponds to the location where the halftone toner image 104 is to be printed.

In one embodiment, the image bearing surface 100 of the image printing system is selected from the group consisting of a photoreceptor drum, a photoreceptor belt, an intermediate transfer belt, and an intermediate transfer drum. That is, the term image bearing surface means any surface on which a toner image is received, and this may be an intermediate surface (i.e., a drum or belt on which a toner image is formed prior to transfer to the printed document). For example, a "tandem" xerographic color printing systems (e.g., U.S. Pat. Nos. 5,278,589; 5,365,074; 6,904,255 and 7,177,585, each of which are incorporated by reference), typically include plural print engines transferring respective colors sequentially to an intermediate image transfer surface (e.g., belt or drum) and then to the final substrate.

The image printing system generally has two important dimensions: a process (or slow scan) direction and a cross-process (or fast scan) direction. The direction in which the image bearing surface moves is referred to as the process (or slow scan) direction. The cross-process (or fast scan) direction is generally perpendicular to the process (or slow scan) direction.

Figure 2:
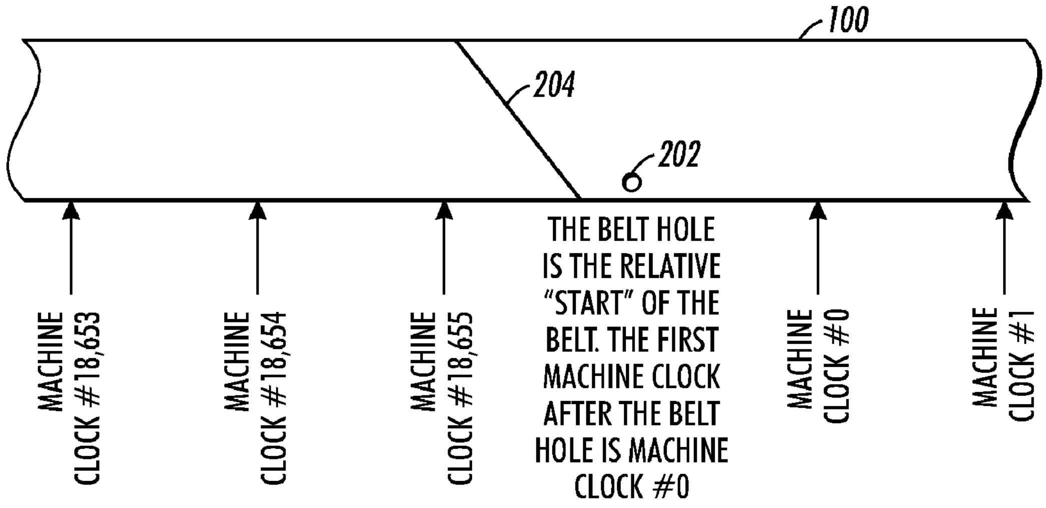
FIG. 2 shows labeling of the image bearing surface profile in accordance with an embodiment of the present disclosure.
Figure 3:
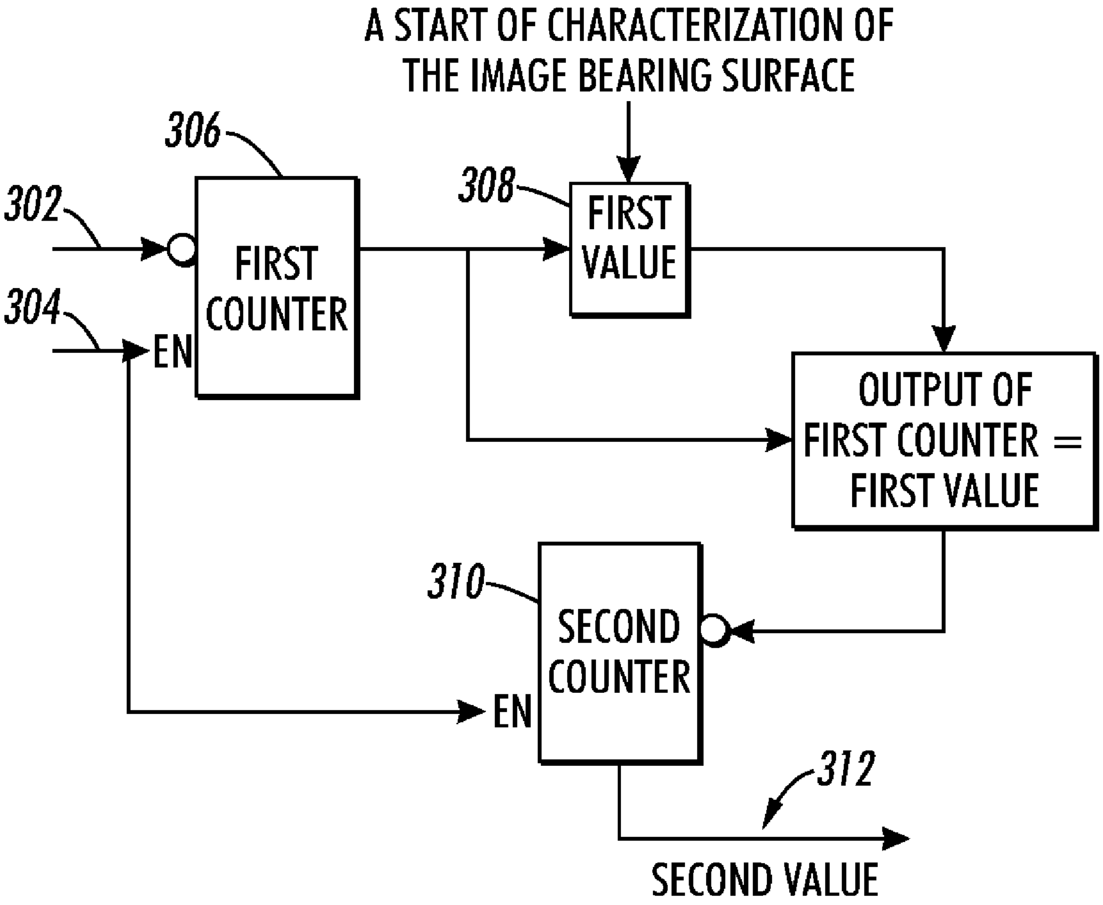
FIG. 3 shows a process flow diagram to determine a location on the image bearing surface of the image printing system where the toner image is to be printed in accordance with an embodiment of the present disclosure.

Referring to FIGS. 2 and 3, the first signal 302 is generated from the detector (not shown) that is configured to detect the reference mark (e.g., a belt hole 202) on the image bearing surface 100. This may also be referred to as a reference mark signal. In one embodiment, the first signal 302 is generated once for every revolution of the image bearing surface 100, when the detector detects the reference mark on the image bearing surface 100. In one embodiment, the detector is an optoelectronic sensor. In another embodiment, the detector may be any other type of detector that is configured to detect the reference mark and to generate the first signal 302. In one embodiment, the detector is in the form of a belt hole sensor that is configured to detect the presence of the belt hole 202. The belt hole 202 may be provided in the image bearing surface 100 at a predetermined distance from a seam 204 on the image bearing surface 100. The detector detects the passing of the belt hole 202 that may be located in an outer edge of the image bearing surface 100. This allows the number and time of each image bearing surface revolution to be monitored. The reference mark located on the image bearing surface 100 may have any shape, size or configuration as long as the detector detects the reference mark to generate the first signal 302.

The second signal 304 is generated from a clock system (not shown) that counts incremental movements of the image bearing surface 100. This may also be referred to as a clock or counting signal. The clock system may be a counter or other device that monitors the incremental movements of the image bearing surface 100. Each time a clock or counting signal is counted, that indicates movement of the image bearing surface 100 by the applicable increment. In one embodiment, the clock system includes an encoder (not shown) coupled to a drive system or mechanism of the image bearing surface 100 that is configured to generate encoder pulses. The encoder may be a mechanical encoder. For example, the second signal may be generated 18,655 times in every revolution of the image bearing surface 100. In other words, there are approximately 18,655 second signals for every revolution or the image bearing surface 100. The number of second signals generated in every revolution of the image bearing surface may change from one image printing system to another.

In one embodiment, the first signal 302 from the detector and the second signal 304 from the clock system are independent of each other. That is, they are asynchronous and are not tied together. In one embodiment, the first signal 302 and the second signal 304 may be concurrent and may occur at the same time. In another embodiment, the first signal 302 and the second signal 304 may be separated from each other by a time difference.

In one embodiment, the belt hole 202 or the reference mark on the image bearing surface 100 is the "relative" start of the image bearing surface 100. As shown in FIG. 2, the second signal 304 received after the belt hole 202 or the reference mark on the image bearing surface 100 is detected by the detector and labeled as second signal or machine clock #0. In the similar manner, as shown in FIG. 2, every consecutive second signal 304 generated is labeled in an incremental fashion, for example, the next second signals generated are second signal or machine clock #1, second signal or machine clock #2, and so on till second signal or machine clock #18, 655.

FIG. 3 shows a process flow diagram to determine a location on the image bearing surface 100 of the image printing system where the toner image is to be printed in accordance with an embodiment of the present disclosure. The method of the present disclosure comprises (a) determining a first value 308 that correlates the first signal 302 and the second signal 304, where the first value 308 corresponds to a value of the second signal 304 at a start of characterization of the image bearing surface 100, and (b) determining a second value 312 using the first value 308, where the second value 312 provides the location on the image bearing surface 100 where the toner image is to be printed.

In one embodiment, the first value 308 and second value 312 are determined using a first counter 306 and a second counter 310. In one embodiment, the first counter 306 and the second counter 310 may be a software or hardware type counters.

In one embodiment, the first counter 306 is enabled by the second signal 304. In one embodiment, the first counter 306 is configured to reset to zero, when the detector detects the reference mark or the belt hole 202 on the image bearing surface 100. In one embodiment, the output of the first counter 306 ranges from zero to number of second signals generated for every revolution of the image bearing surface 100. As there are 18,655 second signals generated in one revolution of the image bearing surface 100, the output of the first counter 306 ranges from zero to 18,655.

At the start of the characterization of the image bearing surface 100, the output value stored in the first counter 306 is taken and is stored as the first value 308. In one embodiment, the start of the characterization of the image bearing surface corresponds to a start point where the image bearing surface profiles are taken. In one embodiment, the first value 308 is equal to an output value of the first counter 306 at the start of the characterization of the image bearing surface 100. The first value 308 may be changed every time the start of the characterization of the image bearing surface 100 is performed. In other words, the first value 308 retains its value until the next time the start of the characterization of the image bearing surface is performed. The first value 308 may be re-calculated every time the image bearing surface 100 is re-characterized, so the first value 308 remains accurate and does not drift over time.

In one embodiment, the second counter 310 is enabled by the second signal 304. In one embodiment, the output of the second counter 310 ranges from zero to the number of second signals generated for every revolution of the image bearing surface 100. As there are 18,655 second signals generated in one revolution of the image bearing surface 100, the output of the second counter 310 ranges from zero to 18,655. In one embodiment, the second counter 310 is reset to zero, when the output value of the first counter 306 is equal to the first value 308.

The second value 312 is determined using the first value 308. As noted above, at a later time after the start of characterization of the image bearing surface, when the output value of the first counter 306 is equal to the first value 308, the second counter 310 is reset to zero. Thus, resetting of the second counter 310 helps in determining an offset between the first counter 306 and the second counter 310. This offset between the first counter 306 and the second counter 310 is equal to the output value of the first counter 306 or the first value 308, at an instance of time when the output value of the first counter 306 is equal to the first value 308. Thereafter, at a later time after the offset is determined, a toner image is being processed at an output value of the first counter 306. When a toner image is being processed at an output value of the first counter 306, a corresponding output value of the second counter 310 may be determined by subtracting the offset (i.e., between the output value of the first counter 306 and the output value of the second counter 310) from the output value of the first counter 306 (i.e., at which the toner image is being processed). The output value of the second counter 310 at an instance of time when the toner image is being processed provides the second value 312.

In one embodiment, the second value 312 provides the location on the image bearing surface 100 where the toner image is to be printed. As noted above, the second value 312 is equal to an output value of the second counter 310, when the toner image is processed. In one embodiment, the second value 312 provides the image bearing surface profile required for the halftone toner image that is being processed. In other words, the second value 312 provides a number of the image bearing surface profile that corresponds to the current tone image.

As noted above, the first image bearing surface profile (e.g., before the toner image is placed on the image bearing surface) collected and stored is referenced as image bearing surface profile #0. The next one is the image bearing surface profile #1, and so on, until image bearing surface profile #18,655. In one embodiment, the first counter 306 may not be equal to zero at the time that image bearing surface profile #0 is collected. The first value 308 is the output value of the first counter 306 at the time that image bearing surface profile #0 is collected. In one embodiment, the belt hole 202 (as shown in FIG. 2) or the reference mark on the image bearing surface 100 is used as a reference to label the image bearing surface profiles that are stored on every second signal 304 generated.

Figure 4A:
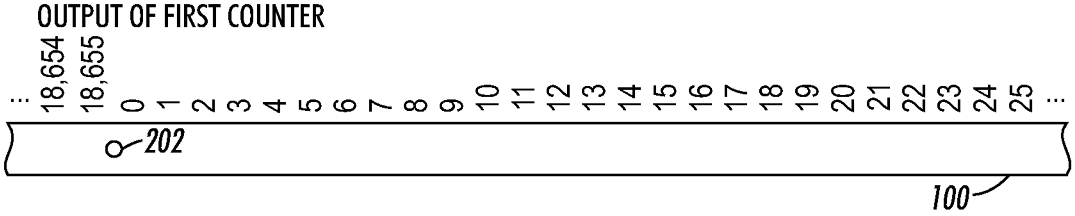
FIGS. 4A and 4B show an exemplary embodiment of the present disclosure for determining a first value.
Figure 4B:
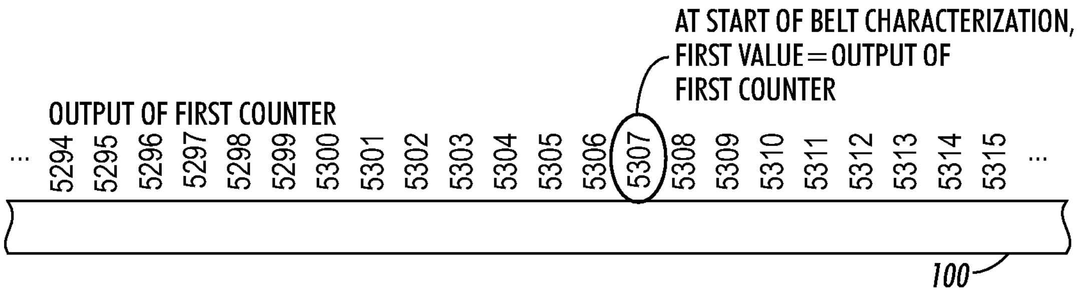

FIGS. 4A and 4B show an exemplary embodiment of the present disclosure for determining the first value 308. FIG. 4A shows the image bearing surface 100 with the belt hole 202. The output of the first counter 306 is shown in FIG. 4A. As noted above, the output of the first counter 306 starts at zero (e.g., when the belt hole 202 is detected by the detector) and increments all around the image bearing surface 100, until 18,655. As shown in FIG. 4B, the first value 308 is equal to an output value of the first counter 306 at the start of the characterization of the image bearing surface 100. In the illustrated embodiment, the first value 308 is equal to "5307", which is the output value of the first counter 306 at the start of the characterization of the image bearing surface 100.

Figure 5A:
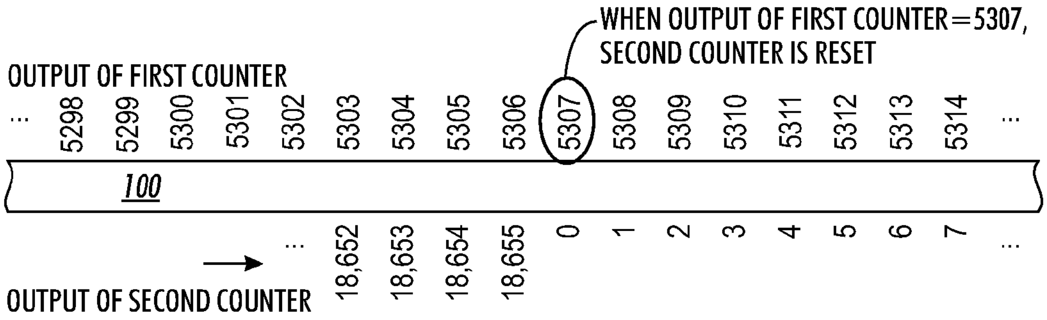
FIGS. 5A and 5B show an exemplary embodiment of the present disclosure for determining a second value.
Figure 5B:
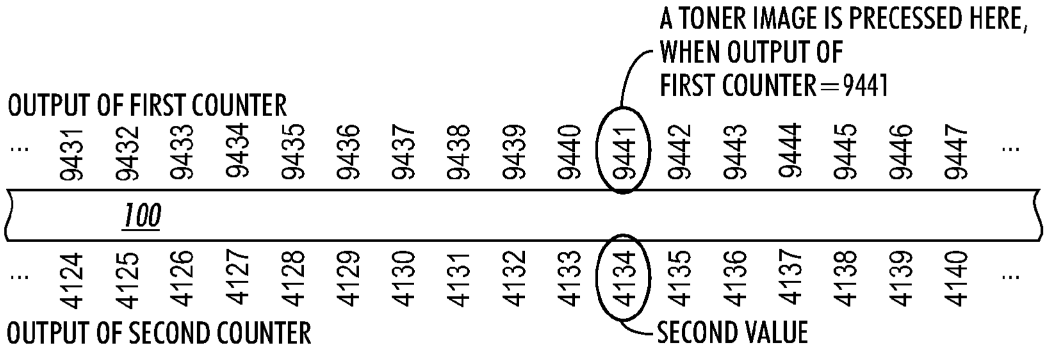

FIGS. 5A and 5B show an exemplary embodiment of the present disclosure determining the second value 312. FIG. 5A shows the output of the first counter 306 and the output of the second counter 310 (illustrated above and below the image bearing surface 100 respectively). The second counter 310 is reset to zero, at an instance of time, when the output value of the first counter 306 is equal to the first value 308 (e.g., "5307" in the illustrated embodiment). Thus, in the illustrated embodiment, the output value of the first counter 306 and the output value of the second counter 310 are offset by "5307".

At a later time, a toner image is processed, for example in the illustrated embodiment, when the output value of the first counter 306 is "9441". Since the output value of the first counter 306 and the output value of the second counter 310 are offset by "5307", the output value of the second counter 310 that corresponds to the output value of the first counter 306 of "9441" is "4134". The second value 312 is equal to the output value of the second counter 310, at an instance of time, when the toner image is processed. Therefore, the second value 312 in the illustrated embodiment is equal to "4134." The image bearing surface profile that is used to normalize the halftone profile (e.g., which is processed when the output value of the first counter 306 is "9441") is image bearing surface profile #4134.

The present disclosure, thus, provides a method to synchronize the image bearing surface and toner image readings in the image printing system so that calibration can be done accurately for streak detection. The present disclosure precisely identifies the relative machine clock location with respect to start of image bearing surface and toner image signals. An internal counter, registers and logic are used to match up the appropriate location on the image bearing surface and toner images for calibration. The present disclosure solves the problem of uncertainty of machine clock count for different toner images, due to machine variability, making the calibration more accurate. The present disclosure, thus, provides using an internal relative counter to synchronize to the combination of an external asynchronous clock and control signals.

The present disclosure uses the timing signals (e.g., belt hole and machine clocks) to accurately keep track of image bearing surface profiles so the correct image bearing surface profile will be used for each halftone toner image. The method disclosed in the present disclosure is simple and easily implemented in hardware. The method disclosed in the present disclosure works accurately regardless of machine to machine system variations. The method and system disclosed in the present disclosure may be used in any image printing system, for example, in streak correction or any other functionality of the image printing system that needs to align data on the image bearing surface that are collected at two different points in time.

For example, the method of the present disclosure may also be used in determining the start of calibration. In other words, to determine a specific region or location of the belt to do calibration in the image printing system. In this application, the present disclosure determines a distance from the belt hole. The distance from the belt hole, or the offset from the belt hole is then used to determine the start of calibration in the image printing system.

In one embodiment, a processor may be provided that is configured for enabling the embodiments of the present disclosure. The processor may be configured to determine a first value that correlates the first signal and the second signal, and to determine a second value using the first value. As noted above, the first value corresponds to a difference between the first and the second signals at a start of characterization of the image bearing surface and the second value provides a location on the image bearing surface where the toner image is to be printed.

The processor disclosed herein may be dedicated hardware like ASICs or FPGAs, software, or a combination of dedicated hardware and software. For the different applications of the embodiments disclosed herein, the programming and/or configuration may vary. The processor may be incorporated, for example, into a print controller or marking engine controller of an image printing device.

The term "image printing system" as used herein broadly encompasses various printers, copiers, multifunction machines or other image reproduction systems, xerographic or otherwise. The image printing system may include a marking engine that is configured to print the toner images on the image bearing surface.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for determining a location on an image bearing surface of an image printing system where a toner image is to be printed, the method comprising:

generating a first signal from a detector that is configured to detect a reference mark on the image bearing surface, and a second signal from a clock system that counts incremental movements of the image bearing surface;

determining a first value that correlates the first signal and the second signal, wherein the first value corresponds to a value of the second signal at a start of characterization of the image bearing surface, wherein the start of characterization of the image bearing surface corresponds to a starting point where the image bearing surface profiles are taken, and wherein the image bearing surface profiles are configured to process corresponding toner images; and determining a second value using the first value and a value of the second signal at which the toner image is being processed, wherein the second value provides the location on the image bearing surface where the toner image is to be printed.

2. A method in accordance with claim 1, wherein the first signal is generated once for every revolution of the image bearing surface, when the detector detects the reference mark on the image bearing surface.

3. A method in accordance with claim 1, wherein the first and second values are determined using a first counter and a second counter, respectively.

4. A method in accordance with claim 3, wherein the first counter is enabled by the second signal and is reset to zero when the detector detects the reference mark on the image bearing surface.

5. A method in accordance with claim 3, wherein output of the first counter ranges from zero to number of second signals generated for every revolution of the image bearing surface.

6. A method in accordance with claim 3, wherein the first value is equal to an output value of the first counter at the start of the characterization of the image bearing surface.

7. A method in accordance with claim 1, wherein the first value is changed at every start of the characterization of the image bearing surface is performed.

8. A method in accordance with claim 3, wherein the second counter is enabled by the second signal and is reset to zero when the output value of the first counter is equal to the first value.

9. A method in accordance with claim 3, wherein the second value is equal to an output value of the second counter, when the toner image is being processed at an output value of the first counter.

10. A method in accordance with claim 3, wherein the second value is equal to an output value of the second counter at an instance of time when the toner image is being processed.

11. A method in accordance with claim 3, wherein the second value is determined by subtracting the first value from an output value of the first counter at which the toner image is being processed.

12. A method in accordance with claim 1, wherein the second value is determined by subtracting the first value from the value of the second signal at which the tone image is being processed.

13. A method in accordance with claim 1, wherein the image bearing surface profiles are configured to normalize the corresponding toner images.

14. A system for determining a location on an image bearing surface of an image printing system where a toner image is to be printed, the system comprising:

an image bearing surface movable in a process direction, the image bearing surface having a reference mark;

a detector configured to detect the reference mark on the image bearing surface to provide a first signal;

a clock system configured to generate a second signal, the second signal comprising pulses of a clock that counts incremental movements of the image bearing surface;

a marking engine configured to print the toner images on the image bearing surface; and a processor configured:

to determine a first value that correlates the first signal and the second signal, wherein the first value corresponds to a value of the second signal at a start of characterization of the image bearing surface, wherein the start of characterization of the image bearing surface corresponds to a starting point where the image bearing surface profiles are taken, and wherein the image bearing surface profiles are configured to process corresponding toner images; and to determine a second value using the first value and a value of the second signal at which the toner image is being processed, wherein the second value provides a location on the image bearing surface where the toner image is to be printed.

15. A system in accordance with claim 14, wherein the first signal is generated once in every revolution of the image bearing surface, when the detector detects the reference mark on the image bearing surface.

16. A system in accordance with claim 14, wherein the first and second values are determined using a first counter and a second counter, respectively.

17. A system in accordance with claim 16, wherein the first counter is enabled by the second signal and is reset to zero at every first signal.

18. A system in accordance with claim 16, wherein output of the first counter ranges from zero to number of second signals generated for every revolution of the image bearing surface.

19. A system in accordance with claim 16, wherein the first value is equal to an output value of the first counter at the start of the characterization of the image bearing surface.

20. A system in accordance with claim 14, wherein the first value retains its value until the start of the characterization of the image bearing surface is performed next time.

21. A system in accordance with claim 16, wherein the second counter is enabled by the second signal and is reset to zero when the output value of the first counter is equal to the first value.

22. A system in accordance with claim 16, wherein the second value is equal to an output value of the second counter, when the toner image is being processed at an output value of the first counter.

23. A system in accordance with claim 16, wherein the second value is equal to an output value of the second counter at an instance of time when the toner image is being processed.

24. A system in accordance with claim 16, wherein the second value is determined by subtracting the first value from an output value of the first counter at which the toner image is being processed.

25. A system in accordance with claim 14, wherein the second value is determined by subtracting the first value from the value of the second signal at which the tone image is being processed.

26. A system in accordance with claim 14, wherein the image bearing surface profiles are configured to normalize the corresponding toner images.

* * * * *